United States Patent [19]

Purcell et al.

[11] Patent Number: 4,485,021

[45] Date of Patent: Nov. 27, 1984

[54] WATER FLOODING PROCESS FOR RECOVERING PETROLEUM

[75] Inventors: Robert F. Purcell, Roselle, Ill.; Robert B. Kayser, Evergreen, Colo.

[73] Assignee: Angus Chemical Company, Northbrook, Ill.

[21] Appl. No.: 533,551

[22] Filed: Sep. 19, 1983

Related U.S. Application Data

[63] Continuation-in-part of Ser. No. 284,764, Jul. 20, 1981, abandoned.

[51] Int. Cl.³ .............................................. E21B 43/22
[52] U.S. Cl. ............................... 252/8.55 D; 166/270
[58] Field of Search ............... 252/8.55 D, 8.55 R; 166/270

[56] References Cited

U.S. PATENT DOCUMENTS 1,651,311  11/1927  Atkinson .
3,302,713   2/1967  Ahearn et al. ............... 252/8.55 X
3,464,492   9/1969  Friedman ............................ 166/270
3,799,263   3/1974  Prillieux et al. ............... 252/8.55 X
3,994,344  11/1976  Friedman ............................ 166/270

OTHER PUBLICATIONS

Jennings et al., "A Caustic Waterflooding Process for Heavy Oils", *J. Pet. Tech.,* Dec. 1974, pp. 1344–1352.
Ehrlich et al., Article in *J. of Pet. Tech.,* Dec. 1974, pp. 1335–1343.

*Primary Examiner*—Herbert B. Guynn
*Attorney, Agent, or Firm*—Robert H. Dewey

[57] ABSTRACT

In the process for recovering petroleum having acidic components from a geological formation containing it by flooding the formation with water, the improvement comprising conducting the flooding in the presence of 2-amino-2-methylpropanol in an amount sufficient to form soaps with the acidic components.

5 Claims, No Drawings

WATER FLOODING PROCESS FOR RECOVERING PETROLEUM

CROSS-REFERENCE TO RELATED APPLICATION

This application is a continuation-in-part of applicants' copending application Ser. No. 284,764 filed July 20, 1981, now abandoned.

BACKGROUND OF THE INVENTION

This invention relates to an improved process for recovery of petroleum from a geological formation containing it. In a particular aspect, this invention relates to an improvement in the process for improving petroleum production by the water-flooding process.

The yield of petroleum from a geological formation is usually far from the total petroleum present because once the pressure on the formation is relieved (or natural flow ceases) there is no easy method for recovering the residual petroleum. This residual petroleum tends to remain in the formation for a variety of reasons and flows to the producing well at a very slow rate—if at all.

It is known to improve petroleum recovery from a geological formation containing it by the process of water flooding. In this process, one or more wells spaced from the production well are drilled and water under pressure is pumped through these auxiliary wells into the surrounding formation. Ideally, the advancing water front sweeps residual petroleum before it to the production well where both water and petroleum are recovered. Actually, however, considerable petroleum is left behind in the formation and there have been numerous attempts to improve the recovery of this petroleum.

H. Atkinson, U.S. Pat. No. 1,651,311 and other workers proposed to improve petroleum recovery from a geological formation containing it by flooding the formation with water containing sodium hydroxide. Although several mechanisms have been proposed, the principal one is that the sodium hydroxide neutralizes organic acids present as components of the petroleum. The soaps thereby formed are surface active and help emulsify the petroleum thus promoting its removal from the formation. It was later discovered that emulsified oil could be substituted for the alkaline water and improve petroleum recovery. However, experience with these processes in the field has been disappointing in that yields did not improve to the extent that laboratory results would indicate. Many of the problems involved in the caustic water flooding process are discussed by H. Y. Jennings, Jr., et al., J. Pet. Tech., December 1974, pages 1344-1352. Among other problems, the authors show that calcium in the water, as well as rock reactivity is deleterious. A review of the history of the caustic and emulsion methods has been provided by C. E. Johnson, Jr., Ibid, January 1976, pages 85-92.

As previously mentioned, the acidic components present in most petroleum sources will react with alkali metal hydroxides to form soaps. However, soluble calcium and magnesium compounds are usually present in the reservoir waters and these also react with the alkali hydroxide. This is disadvantageous because it reduces the amount of sodium hydroxide available to form the petroleum soaps, and also generates undesirable, water-insoluble compounds which may tend to plug the formation.

There is, therefore, a need for an improved process for recovering petroleum by water flooding operations.

SUMMARY OF THE INVENTION

It is an object of this invention to provide a process for the recovery of petroleum from a geological formation containing it.

It is another object of this invention to provide an improved process for the recovery of petroleum from a geological formation by water flooding operations.

Other objects will be apparent to those skilled in the art from the disclosure herein.

It is the discovery of this invention to provide an improvement in the water flooding process for recovering alkaline agent-susceptible petroleum from a geological formation comprising the step of conducting the water flooding operations in the presence of 2-amino-2-methylpropanol (hereinafter designated AMP) in an amount sufficient to react with acidic components of the petroleum. It is also contemplated that the improvement of the present invention is equally useful with the emulsion flooding process.

DETAILED DISCUSSION

In the practice of this invention, the caustic water-flooding process or the emulsion flooding process is carried out in accordance with previous processes except that AMP, which is capable of reacting with the acidic components of petroleum, is substituted for the caustic.

The amine can be injected in any suitable manner but preferably it is dissolved in the water to be used in the water-flooding process. Other suitable means of injecting the amine will be obvious to those skilled in the art and it is not intended that the invention be limited by the manner in which the amine is introduced into the petroleum-containing formation.

The amount of amine to be used is not critical but, in general, it is preferred that there will be at least sufficient present to neutralize the petroleum acids and form soaps with them. An excess of amine is not harmful. In general, a range of from about 0.1% to 5% by weight in the flood waters is sufficient.

The use of AMP has many advantages over the use of sodium hydroxide or other conventional alkaline agents, such as sodium silicate and sodium carbonate. These include the following.

Calcium Resistance

The effect of AMP on lowering of interfacial tension is unaffected by calcium in amounts up to 500 ppm Ca. However, as the calcium concentration increases, IFT reduction decreases just as it occurs with sodium compounds. However, no precipitate occurs with AMP, whereas with, e.g., sodium hydroxide, precipitation of calcium is known to occur. This precipitation results in severe pressure buildup during injection, plugged formations, and ultimately, reservoir damage. As a result, if a 25% pore volume of AMP is injected, the first 5-10% pore volume clears the reservoir of excess calcium and the remaining 15-20% is effective in moving the oil.

Magnesium Resistance

The presence of magnesium with sodium hydroxide and other conventional alkaline agents is known to cause even more precipitation and plugging than does calcium. With AMP, some precipitation may occur but the effect is much less than with sodium compounds and is, therefore, usually useful where sodium compounds are ineffective.

Polymer Compatibility

Water-soluble polymers are frequently used in petroleum reservoir floods to adjust the viscosity of materials being forced through the formation to further enhance movement of the crude oil ahead of the water flood, which has been thickened by the polymer. Sodium hydroxide has an adverse effect on such polymers as polyacrylamide in that it reduces the viscosity, e.g. to about 6–7% of the original value, and the screen factor. Under similar conditions, however, AMP reduces the viscosity to only about 75% of the original value.

Dissolved Solids

High dissolved solids in reservoir water is disadvantageous for conventional alkaline agents as well as with AMP. However, the adverse effect on AMP is less than with other agents, so AMP can be used in marginal conditions where conventional agents are not useful.

Dolomite Core Floods

Dolomite cores are characterized by water with a level of hardness so alkaline sodium salts are not normally considered because they form insoluble salts and plug the formation. AMP will mobilize tertiary oil in such formations and does not plug them. Resistance factors with sodium hydroxide are about three times as high as those with AMP. The resistance factor measures how much more difficult it is to inject a solution into the core relative to the injection of water. Unlike NaOH, AMP does not cause the permeability of the core to continually change and does not result in a continual difficulty of injection.

Formation of Emulsion

Alkaline sodium compounds frequently result in an emulsion of the crude oil in water thus requiring that the emulsion be broken in order to recover the crude, thus adding to the expense of the process. The use of AMP does not result in such emulsions and this is a significant advantage over sodium compounds.

The invention will be better understood with reference to the following examples. It is understood, however, that the examples are intended merely to illustrate the invention and it is not intended that the invention be limited thereby.

EXAMPLE 1

An experiment is conducted in the laboratory using a preserved core sample obtained from a geological formation, unaltered crude oil and characteristic injection water. The experiment is conducted at the temperature expected to be encountered in the reservoir formation. The method employed is the same in all essential details as that described by Ehrlich et al, J. Pet. Tech., December 1972, pages 1335–1343, except that in one test 2-amino-2-methylpropanol (AMP) is substituted for sodium hydroxide in equivalent amounts. The yield of petroleum from the AMP experiment is substantially greater than that from the sodium hydroxide experiment.

EXAMPLE 2

A. This experiment was conducted to measure the effect of AMP on the interfacial tension (IFT) of two samples of acidic crude oil in contact with a brine. Both crude oils were alkaline-agent susceptible crudes. One was designated as ACS and had an acid number of 1.40. The other crude oil, designated CRO, had an acid number of 1.24. The brine contained 0.6248 g of sodium chloride per liter, but free from calcium, magnesium, potassium, sulfate, carbonate and bicarbonate. The AMP reduced the IFT.

| Conc. AMP | Interfacial Tension, dynes/cm | |
| --- | --- | --- |
| % by Vol. | ACS | CRO |
| 0.00 | 19.4 | 17.8 |
| 0.28 | 0.123 | 0.059 |
| 0.46 | 0.106 | 0.062 |
| 0.93 | 0.041 | 0.074 |
| 1.85 | 0.054 | 0.091 |

B. A similar experiment was conducted with ACS crude using sodium hydroxide in a slightly different brine of 0.6072 g/l total solids of which 0.2318 was sodium, 0.0690 was sulfate and 0.3065 was chloride. After initially reducing the IFT, increasing the conc. of the sodium hydroxide raised the IFT as shown by the following data:

| NaOH % Wt | Interfacial Tension, dynes/cm |
| --- | --- |
| 0.0 | 22.0 |
| 0.1 | 0.075 |
| 0.2 | 0.138 |
| 0.4 | 0.155 |
| 1.0 | 0.399 |
| 1.5 | 0.457 |

EXAMPLE 3

This experiment was designed to simulate tertiary recovery from reservoir oil and water saturations in core flood procedures.

Water having high dissolved solids was formulated as follows:

| | | |
| --- | --- | --- |
| Calcium | 5000.0 | ppm |
| Magnesium | 2000.0 | |
| Sodium | 40644.0 | |
| Chloride | 77356.0 | |
| Carbonate (calc.) | 0.7 | |
| Bicarbonate (Calc.) | −0.7 | |
| Total Dissolved Solids | 125000.0 | |

A disk-shaped dolomite core sample was saturated with the water formula by placing the disk in the water in a vacuum vessel and evacuating to about 130 mm Hg. The saturated disk was placed in a core holder and was saturated with oil by displacing the water through injection. Then water was injected in an amount of 50% of the disk pore volume to displace the oil and thereby simulate a waterflood (secondary recovery). Enough water was injected to displace about 90% of the waterflood recoverable oil.

The disk was now injected with 1.85% sodium hydroxide solution in the brine of Example 1-B to 25% of the pore volume, followed by injection of 100% of pore volume of a polymer solution (Nalflo-50, 800 ppm in the brine of Example 1-B) having a viscosity of 58 cps. Then 50–75% of disk pore volume was injected with the brine to complete the movement of tertiary oil. A similar experiment was performed using AMP at 1.85% concentration.

The results are as follows:

| Alkaline Agent (AA) | NaOH | AMP |
|---|---|---|
| Soi (% pv) | 75.3 | 76.5 |
| Sor (% pv) | 48.6 | 47.0 |
| Sof (% pv) | 33.3 | 33.4 |
| % Sor | 14.0 | 17.6 |
| AA injected, meq. | 17.71 | 7.65 |
| AA recovered, meq. | 11.42 | 0.53 |
| AA consumed, meq. | 6.29 | 7.12 |

Sor = oil saturation after waterflood
Soi = initial oil saturation
Sof = final residual oil saturation
% Sor = percent tertiary oil recovery As can be seen, AMP resulted in 3.6% more tertiary oil than NaOH. Also, pressure data from the two core floods indicated that the NaOH core flood had immediate wellbore sand face plugging with subsequent internal plugging while very little, if any, plugging occurred with AMP.

EXAMPLE 4

The experiment of Example 3 was repeated in all essential details except that a Berea sandstone core was substituted for the dolomite core and the water was formulated to the following composition:

| Calcium | 2500 ppm |
|---|---|
| Magnesium | 20 |
| Sodium | 196 |
| Chloride | 4784 |
| Carbonate (Calc.) | −1.1 |
| Bicarbonate (Calc.) | 1.9 |
| Total Dissolved Solids | 7500 |

The results obtained were as follows:

| Alkaline Agent (AA) | NaOH | AMP |
|---|---|---|
| Soi (% pv) | 71.6% | 72.1% |
| Sor (% pv) | 38.3 | 42.5 |
| Sof (% pv) | 35.0 | 39.7 |
| % Sor | 8.7 | 6.5 |
| AA injected, meq. | 17.71 | 7.65 |
| AA recovered, meq. | 3.03 | 1.26 |
| AA consumed, meq. | 14.68 | 6.39 |

It is apparent that AMP performed much better than NaOH on an equivalent weight basis in the presence of high calcium concentrations.

During this experiment, data were taken to calculate resistance factor, which is a measure of the increase in difficulty in injecting a solution into the core as compared to injecting water alone. The results showed that in the sodium hydroxide flood, the resistance factor (RF) continued to increase during the polymer and fresh water injection following the sodium hydroxide injection. When AMP was substituted for NaOH, the RF did not increase to as high a level during the polymer injection and fell after introduction of the fresh water. These results show that formation plugging in the presence of high calcium ion concentration is less when AMP is used than when NaOH is used.

EXAMPLE 5

The object of the experiment was to study the compatibility of AMP with polymers used in water flooding processes.

Nalflo-50 water-soluble polymer marketed by Nalco Chemical Company was dissolved in water containing 600 ppm dissolved solids (240 ppm of sodium plus 379 ppm of chloride) at three concentrations. AMP and sodium hydroxide were added to aliquots of the polymer dispersion to provide three concentrations. The viscosities and screen factors of each solution were then determined at 70° F. The results are as follows:

| | | Viscosity, cps | | Screen Factor | |
|---|---|---|---|---|---|
| | | Polymer at 1026 ppm | | | |
| Alkaline Agent | | AMP | NaOH | AMP | NaOH |
| Conc.*, | 0.00% | 85.0 | 85.0 | 28.0 | 28.0 |
| | 0.28% | 72.5 | 20.5 | 26.4 | 18.7 |
| | 0.93% | 67.0 | 17.8 | 26.9 | 15.6 |
| | 1.85% | 65.0 | 16.9 | 26.7 | 14.9 |
| | | Polymer at 602 ppm | | | |
| Alkaline Agent | | AMP | NaOH | AMP | NaOH |
| Conc., | 0.00% | 37.0 | 37.0 | 20.3 | 20.3 |
| | 0.28 | 30.0 | 11.0 | 18.4 | 14.7 |
| | 0.93 | 29.0 | 6.5 | 19.1 | 11.7 |
| | 1.85 | 28.5 | 6.0 | 19.6 | 10.2 |
| | | Polymer at 389 ppm | | | |
| Conc., | 0.00% | 19.5 | 19.5 | 51.1 | 51.1 |
| | 0.28 | 15.5 | 5.5 | 14.4 | 10.9 |
| | 0.93 | 14.5 | 4.0 | 15.1 | 9.2 |
| | 1.85 | 14.5 | 3.5 | 16.0 | 8.4 |

*AMP concentration was volume percent; NaOH concentration was weight percent.

While a small amount of AMP reduces the viscosity of the initial value, increasing the concentration does not seriously affect it. By comparison, NaOH reduces the viscosity dramatically.

A small amount of AMP reduces the screen factor slightly, but increasing amounts of AMP have no significant effect at the higher polymer concentration and increase the screen factor at lower polymer concentrations. By comparison, NaOH reduced the screen factor to as low as 52% of the original and the reduction is related to the concentration.

EXAMPLE 6

The experiment of Example 5 was repeated in all essential details except that the polymer Cyanatrol 9405 marketed by American Cyanamid Company was substituted for the Nalco polymer. The results are as follows:

| | | Viscosity, cps | | Screen Factor | |
|---|---|---|---|---|---|
| | | Polymer at 1276 ppm | | | |
| Alkaline Agent | | AMP | NaOH | AMP | NaOH |
| Conc., | 0.00% | 85.0 | 85.0 | 26.4 | 26.4 |
| | 0.28 | 77.5 | 28.5 | 24.1 | 20.3 |
| | 0.93 | 76.5 | 13.0 | 28.4 | 16.2 |
| | 1.85 | 75.0 | 9.5 | 28.5 | 13.6 |
| | | Polymer at 785 ppm | | | |
| Conc., | 0.00% | 38.0 | 38.0 | 16.7 | 16.7 |
| | 0.28 | 35.0 | 13.0 | 18.4 | 14.0 |
| | 0.93 | 33.7 | 6.5 | 19.5 | 11.9 |
| | 1.85 | 32.5 | 3.5 | 20.1 | 8.4 |
| | | Polymer at 542 ppm | | | |
| Conc., | 0.00% | 22.0 | 22.0 | 12.2 | 12.2 |

-continued

|  | Viscosity, cps |  | Screen Factor |  |
|---|---|---|---|---|
| 0.28 | 19.0 | 7.5 | 14.0 | 10.8 |
| 0.93 | 19.0 | 5.0 | 15.1 | 9.5 |
| 1.85 | 19.0 | 3.5 | 15.3 | 8.4 |

It is apparent that AMP has little adverse effect on this polymer and the screen factor actually increases with increase in concentration of AMP. By comparision, sodium hydroxide has a very adverse effect on viscosity and screen factor.

EXAMPLE 7

During the experiment of Example 3, data were taken to calculate resistance factor. The resistance factor measures the increase in difficulty in injecting a solution into the core as compared to injecting the water alone. The resistance factor is determined as follows:

$$R.F. = \frac{\Delta P/Q \text{solution}}{\Delta P/Q \text{water}}$$

where
$\Delta P$ = the pressure differential across the core
$Q$ = the fluid flow rate through the core.

Water, formulated to contain 125,000 ppm total dissolved solids, was started through the dolomite core at a rate of 24.63 cc/hr until 0.5 pore volume had been injected. During this period the pressure dropped from an initial 5.94 psi to 1.13 and the resistance factor dropped from 5.26 to 1.00.

Sodium hydroxide 1.85% by weight dissolved in water containing 607.3 ppm total dissolved solids as sodium sulfate and chloride, was injected through the core at the same flow rate until 0.25 pre volume had been injected. The starting pressure was 4.50 psi, rose to 4.90 after 0.029 pore volume had been injected and dropped to 3.06 at the end. The resistance factor started at 3.98, rose to 4.34 at the maximum pressure, and dropped to 2.71 at the end.

In a similar experiment AMP was substituted for sodium hydroxide. The resistance factor for AMP solution was 1.10 after 0.086 pore volume was injected and 1.50 after 0.250 pore volume.

It is apparent that the permeability of the dolomite core continually decreased with sodium hydroxide injection, probably as a result of precipitation plugging that did not occur with AMP.

We claim:

1. In a water-flooding process for recovering petroleum having acidic components from a geological formation containing it, the improvement comprising conducting the water-flooding in the presence of 2-amino-2-methylpropanol in an amount sufficient to form a soap with the acidic components and recovering petroleum from said formation.

2. A water-flooding process for the recovery of petroleum having acidic components from a geological formation comprising the steps of injecting water containing from 0.1 to 5% by weight of 2-amino-2-methylpropanol sufficient to form a soap with said acidic components and recovering petroleum from said formation.

3. The process of claim 2 wherein the process is operated in the presence of calcium ion.

4. The process of claim 2 wherein the process is operated in the presence of magnesium ions.

5. The process of claim 2 wherein the geological formation is dolomite.

* * * * *